United States Patent
Sakamoto

(10) Patent No.: US 6,480,620 B1
(45) Date of Patent: *Nov. 12, 2002

(54) METHOD OF AND AN APPARATUS FOR 3-DIMENSIONAL STRUCTURE ESTIMATION

(75) Inventor: Shizuo Sakamoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/487,875

(22) Filed: Jan. 20, 2000

Related U.S. Application Data

(62) Division of application No. 08/950,599, filed on Oct. 15, 1997.

(30) Foreign Application Priority Data

Oct. 15, 1996 (JP) .............................. 8-272676

(51) Int. Cl.[7] ................................. G06K 9/00
(52) U.S. Cl. .................... 382/154; 382/106; 382/173; 382/190; 348/47; 356/11; 356/12
(58) Field of Search ................. 382/106, 154, 382/173, 190; 345/139, 113; 348/47, 585; 356/11, 12

(56) References Cited

U.S. PATENT DOCUMENTS

| | | | |
|---|---|---|---|
| 4,573,191 A | * 2/1986 | Kidode et al. | 382/106 |
| 4,873,651 A | 10/1989 | Raviv | 364/513 |
| 4,875,097 A | * 10/1989 | Jackson | 348/585 |
| 4,982,438 A | 1/1991 | Usami et al. | 382/25 |
| 5,077,608 A | * 12/1991 | Dubner | 348/583 |
| 5,577,130 A | * 11/1996 | Wu | 382/106 |
| 5,734,743 A | * 3/1998 | Matsugu et al. | 382/154 |
| 5,768,415 A | 6/1998 | Jagadish et al. | 382/154 |
| 5,818,959 A | * 10/1998 | Webb et al. | 382/154 |
| 5,852,672 A | 12/1998 | Lu | 382/154 |
| 5,867,591 A | 2/1999 | Onda | 382/154 |
| 5,923,773 A | * 7/1999 | Oshima | 382/154 |
| 6,049,625 A | * 4/2000 | Sakamoto | 382/154 |

FOREIGN PATENT DOCUMENTS

JP 4-329481 11/1992

OTHER PUBLICATIONS

Masatoshi Okutomi, et al., "A Multiple–Baseline Stereo", *IEEE Transactions on Pattern Analysis and Machine Intelligence*, vol. 15, No. 4, pp. 353–363, Apr. 1993.

* cited by examiner

Primary Examiner—Leo Boudreau
Assistant Examiner—Sheela Chawan
(74) Attorney, Agent, or Firm—Foley & Lardner

(57) ABSTRACT

A method of 3-dimensional structure estimation of the invention, making use of a plurality of stereo-pictures, repeats, for each pixel of a first picture, a step of extracting corresponding small regions (4) corresponding to the concerning pixel according to a depth estimation (68); a step of calculating a neighboring correspondence value for each of the corresponding small regions representing correspondence among neighboring corresponding small regions of picures taken by neighboring cameras; a step of obtaining a sum (61) of the neighboring correspondence values; and selecting a value of the depth estimation (68) which gives a singular value of the sum (61) representing correspondence among the corresponding small regions.

13 Claims, 10 Drawing Sheets

_METHOD OF AND AN APPARATUS FOR 3-DIMENSIONAL STRUCTURE ESTIMATION_

This application is a divisional of application Ser. No. 08/950,599, filed Oct. 15, 1997.

BACKGROUND OF THE INVENTION

The present invention relates to a method of and an apparatus for 3-dimensional structure estimation which is used for obtaining 3-dimensional information of an object from 2-dimensional image data of the object, and more particularly to those based on triangular surveying making use of multiple sets of 2-dimensional image data of an object taken from multiple viewing positions.

There is a 3-dimensional structure estimation technique called stereo-method, which estimates 3-dimansional structure of an object based on the triangular surveying from multiple sets of 2-dimensional image data taken from multiple viewing positions. A conventional example of the stereo-method is described in a paper entitled "A Multiple-Baseline Stereo" by Okutomi et al, IEEE Transaction on Pattern Analysis and Machine Intelligence, pp. 353-363, Vol. 15, No. 4, April 1993.

First, principle of the stereo-method is described referring to a schematic diagram of FIG. 6.

Suppose a first camera 10-1, with a lens having a focal distance F, which is positioned on an X-Y plane, perpendicular to the sheet of FIG. 6, so that center of the lens is at coordinates ($X_1$, 0) and optical axis is perpendicular to the X-Y plane, and a second camera 10-2, with its lens having the same focal distance F, which is positioned parallel to the first camera 10-1 so that center of its lens is at coordinates ($X_2$, 0).

Defining the coordinates ($X_1$, 0) and ($X_2$, 0) as viewing positions of the first camera 10-1 and the second camera 10-2, respectively, a distance B =$X_2$-$X_1$ between the two viewing positions is hereafter called the baseline B of the first and the second camera 10-1 and 10-2.

When a first and a second picture of an object 1 are taken by the first and the second camera 10-1 and 10-2 having the baseline B, and a position P of the object 1 is projected at points $p_1$ and $p_2$ of the first and the second picture, that is, on focal planes of the first and the second camera 10-1 and 10-2, respectively, a disparity d between the points $p_1$ and $p_2$ is represented as follows:

$$d = x_2 - x_1 = BF/z, \quad (1)$$

where $x_1$ and $x_2$ are x-components of coordinates of the points $p_1$ and $p_2$ on x-y planes having their origins on the centers of the first and the second picture, respectively, and z is a depth, that is, a distance to the X-Y plane of the position P of the object 1.

Therefore, information of 3-dimensional structure of the object 1 can be estimated from the disparity d if each point $p_1$ of the first picture is known to correspond to which point $p_2$ of the second picture.

In general, the stereo-method is performed according to an algorithm wherein a depth z at an interesting point $p_1$ of the first picture is estimated by retrieving a point $p_2$ of the second picture having correspondence to the interesting point $p_1$, and by repeating above procedure for each point $p_1$ of the first picture, depth of each position P of the object 1 is estimated on the first picture taken by the first camera 10-1.

In many algorithms, the correspondence is discriminated when an evaluation value such as brightness difference between the concerning two points $p_1$ and $p_2$, or sum of brightness differences between two small regions around the concerning two points $p_1$ and $p_2$ becomes minimum in a retrieving range defined as follows. When a possible depth z to be obtained is between $z^{min}$ to $z^{max}$, the disparity d should be between $d^{min}$=$BF/z^{max}$ to $d^{max}$=$BF/z^{min}$ from the equation (1).

Therefore, the corresponding point $P_2$ should be retrieved in a range $x_1+d^{min} \leq x_2 \leq x_1+d^{max}$.

In some algorithms, points in the retrieving range showing the evaluation value, brightness difference for example, within a threshold value are selected as candidates of the corresponding point, and one of the candidates which gives the most smooth variation of the depth z is determined as the corresponding point. Further, when there is known an obstacle 2 as illustrated in FIG. 7 in front of the object 1, correspondence retrieved in a range where the obstacle 2 should exists are rejected in many algorithms as correspondence physically impossible.

Returning to the equation (1), the disparity d is in proportion to the baseline B for the same depth z, and preciseness of the disparity d is limited according to the picture resolution. Therefore, the larger disparity d gives the higher precision of the estimated depth z, and the longer baseline B is preferable for the purpose. However, a longer baseline B gives a wider retrieving range as above described, causing a greater possibility of a false correspondence.

Therefore, there is a tradeoff between precision and false frequency of the estimation.

Techniques for dealing with this tradeoff can be classified into two methods. In one method, a coarse estimation is performed by retrieving correspondence between a pair of low resolution images, then a precise estimation is performed with a pair of high resolution images eliminating false correspondence inconsistent with the coarse estimation. Another approach is a method (hereafter called the multi-baseline stereo method) wherein multiple images of an object taken from multiple viewing positions having different baselines are used so that the evaluation value varies greatly according to whether there is correspondence or not.

In the prior paper beforehand mentioned of Okutomi et al., the latter approach, namely, the multi-baseline stereo method is applied.

Now, the multi-baseline stereo-method in the prior paper is described referring to a schematic diagram of FIG. 8.

In FIG. 8, n pictures of an object 1 are taken by a first to n-th cameras 10-1 to 10-n, each having a lens with a focal distance F and positioned at each of viewing positions ($X_1$, 0) to ($X_n$, 0) on an X-Y plane so as to have optical axis thereof perpendicular to the X-Y plane, n being a positive integer. Each of baselines $B_{1,2}$ to $B_{1,n}$ is that between the first camera 10-1 and each of the other cameras 10-2 to 10-n. A position P having a depth z of the object 1 is projected at points $p_1$ to $p_n$ of the n pictures, $x_1$ to $x_n$ being distances of the points $p_1$ to $p_n$ in X-direction to centers of the n pictures.

Here, n-1 disparities $d_{1,2}$ to $d_{1,n}$ between n-1 pairs of points $p_1$ and $p_2$ to $p_1$ and $p_n$ are obtained as follows:

$$\left.\begin{aligned} d_{1,2} &= x_2 - x_1 = B_{1,2}F/z \\ d_{1,3} &= x_3 - x_1 = B_{1,3}F/z \\ &\vdots \\ d_{1,n} &= x_n - x_1 = B_{1,n}F/z \end{aligned}\right\} \quad (2)$$

Therefore, for a depth estimation z of a position P, correspondence between n-1 pairs of points represented by the above equations (2) can be checked, enabling to improve the estimation precision making use of long baselines and reducing false correspondence at the same time.

In the algorithm of the multi-baseline stereo method, a similar step to the algorithm with two cameras described in connection with FIG. 6 of retrieving a corresponding point to an interesting point $p_1$ of the first picture is performed for each of the other pictures taken by the second to the n-th cameras 10-2 to 10-n, and above procedure is repeated for each point of the first picture.

In the algorithm with two cameras, the retrieving range is defined concerning the disparity d. However, in the multi-baseline stereo-method of the prior paper, the retrieving range is defined with an inverse distance $1/z$, namely a reciprocal of the depth z, and the corresponding point giving a minimum of an evaluation value is retrieved in each of the other pictures according to the equations (2) by varying the inverse distance from $1/z^{max}$ to $1/z^{min}$.

As to the evaluation value, sum of the sums of squared-difference values between small regions of each pair of pictures is applied in the prior paper.

FIG. 9 is a schematic diagram illustrating the small regions 115-1 to 115-n of n pictures of a rectangular solid 3 corresponding to left-upper front corner thereof taken with the first to the n-th cameras 10-1 to 10-n. The sum of squared-difference values between the first small region 115-1 and each of the other small regions 115-2 to 115-n is calculated for the first. Then, a value of the inverse distance $1/z$ which makes minimum the total value of n−1 sums thus calculated is retrieved between $1/z^{max}$ to $1/z^{min}$. This procedure is performed for every point of the first picture take by the first camera 10-1.

Thus, the multi-baseline stereo-method of the prior paper is performed.

However, when there is a large disparity, there may arise an extreme difference between a pair of small regions, such as the pair of the small regions 115-1 and 115-n of FIG. 9, although both representing the same corner. In such a case, the calculated value of the inverse distance $1/z$ may be shifted by the extreme difference, in the multi-baseline stereo-method of the prior paper.

In a Japanese patent application laid open as a Provisional Publication No. 329481/'92 entitled "A Method of and an Apparatus for Obtaining 3-Dimensional Data", there is disclosed a method of estimating 3-dimensional structure to be applied even when there is a large disparity between a pair of stereo pictures.

In this prior art, variation of a correlation value between two small regions is calculated varying the disparity. When there can not be found a clear singular point in the correlation value, revision of size and scope of the small regions or distortion of one of the small regions, for example, is performed according to pattern of variation curve of the correlation value.

In the examples heretofore described, a sum of squared-difference of pixel brightness or a correlation value between small regions is used as the evaluation value for discriminating corresponding points in the stereo pictures. Beside these values, there are known stereo-methods making use of difference of edge lines or texture information as the evaluation value.

Problems in these proir arts are as follows.

First, in methods to compare small regions of pictures taken by a pair of cameras, correspondence of the small regions may not be discriminated correctly because of the large difference of viewing angle, when the baseline of the pair of cameras is large. In the method disclosed in the Japanese patent application Provisional Publication No. 329481/'92, revision of size and scope of the small regions or distortion of one of the small regions is performed for dealing with this problem. However, the revision or the distortion requires somewhat ad hoc technique and it is very difficult to establish rules for the revision or distortion widely applicable. Therefore, it can be said that there was a limit of the baseline with the conventional methods for discriminating correspondence referring the small regions.

Second, difference of brightness because of variation of reflectivity according to difference of viewing angle is not considered in the prior arts.

When pictures of an object are taken by cameras from different viewing position, brightness of a point of the object differs generally in each picture owing to difference of viewing angle as illustrated in FIG. 10. In FIG. 10, brightness of a point P of an object 1 illuminated by a light 7 becomes highest in a direction symmetric to the light 7 for the normal line of the point P, and varies according to viewing direction, that is, angle to the viewing position. Therefore, when the corresponding points is discriminated by evaluating simply the sum of squared-difference of pixel brightness between small regions, it is easily affected with the above variation of reflectivity, and so, does not become sufficiently small even at the corresponding point, resulting in an increase of the estimation errors.

The effect of the reflectivity variation may be reduced by applying the correlation value, or the difference of edge lines or texture information as the evaluation value. However, these values should be calculated from the small regions, and so, are not free from the first problem which limits the baseline length, and accordingly, the estimation precision.

SUMMARY OF THE INVENTION

Therefore, a primary object of the present invention is to provide a method of and an apparatus for 3-dimensional structure estimation wherein a high estimation precision and a high estimation reliability are both realized at the same time.

In order to achieve the object, a method of 3-dimensional structure estimation of the invention for estimating a 3-dimensional structure of an object from image data of a plurality of pictures of the object each taken from each viewing position ranged on a straight line by a camera with an optical axis parallel to a direction perpendicular to the straight line has a step of performing, for each pixel of image data of a first of the plurality of pictures, steps of:

extracting corresponding small regions, having a size of at least one pixel, each from the image data of each of the plurality of pictures, a position of each of the corresponding small regions in corresponding each of the plurality of pictures being defined by a focal distance of the camera, a distance between a viewing position wherefrom the corresponding each of the plurality of pictures is taken and a viewing position wherefrom the first of the plurality of pictures is taken, a position of a concerning pixel of image data of the first of the plurality of pictures, and a variable representing a depth of a point of the object corresponding to the concerning pixel;

calculating a neighboring correspondence value for each of the corresponding small regions, the neighboring correspondence value representing correspondence among the corresponding small regions of neighboring certain of the plurality of pictures, viewing positions wherefrom the neighboring certain are taken being ranged within a predetermined distance from a viewing position wherefrom a picture including said each of the corresponding small regions is taken;

obtaining a sum of the neighboring correspondence value of all of the corresponding small regions; and selecting an estimation value in a predetermined range of the variable which gives a singular value of the sum of the neighboring correspondence value, and outputting the estimation value as an estimation of the depth of the point corresponding to the concerning pixel.

Therefore, the first problem of the prior arts beforehand described that the correspondence of the small regions may not be discriminated correctly because of the extreme difference thereof due to large difference of viewing angle can be eliminated in the invention, enabling to obtain still higher estimation precision by enlarging the baseline length.

Further, the neighboring correspondence value is so calculated as to represent relative differential of concerning pixel values, such as a variance, for example, of pixel values in the corresponding small regions of the neighboring certain of the plurality of pictures.

Therefore, the second problem of the prior arts that the correspondence estimation is easily affected with the variation of reflectivity owing to difference of viewing angles can be also reduced greatly in the invention, resulting in still higher estimation reliability.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
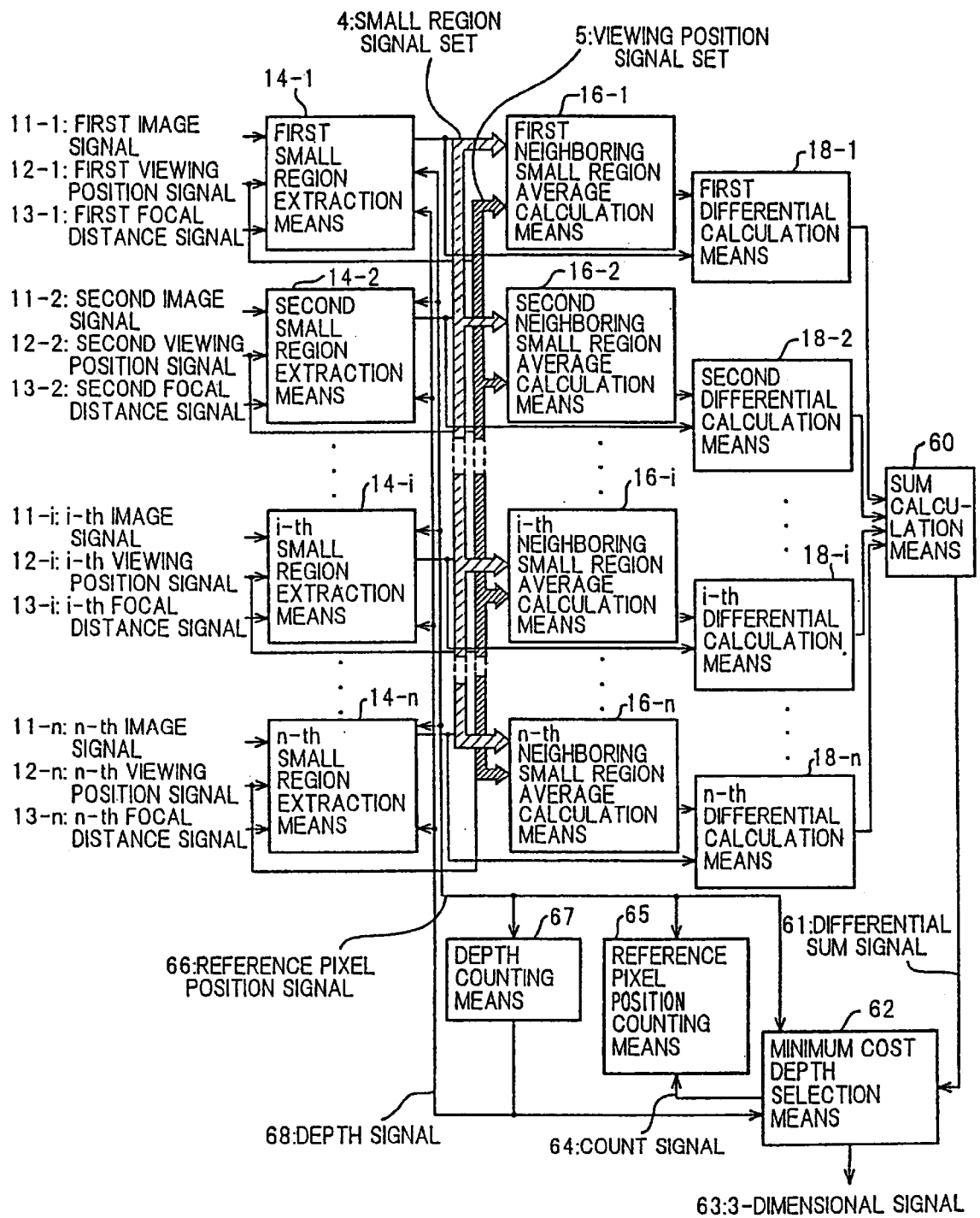
FIG. 1 is a block diagram illustrating an apparatus for 3-dimensional structure estimation according to a first embodiment of the invention.

FIG. 1 is a block diagram illustrating an apparatus for 3-dimensional structure estimation according to a first embodiment of the invention for estimating a 3-dimensional structure of an object from pictures taken by a first to an n-th camera 10-1 to 10-n such ranged at n viewing position as described in connection with FIG. 8, n being an integer more than one.

The apparatus of FIG. 1 comprises;

first small region extraction means 14-1 for outputting a first corresponding small region signal, the first small region extraction means 14-1 being supplied with a reference pixel position signal 66 together with a first image signal 11-1, a first viewing position signal 12-1 and a first focal distance signal 13-1 supplied from the first camera 10-1, second to n-th small region extraction means 14-2 to 14-n, each of the second to the n-th small region extraction means 14-2 to 14-n being supplied with the reference pixel position signal 66 and a depth signal 68 together with corresponding each of a second to an n-th image signal 11-2 to 11-n, corresponding each of a second to an n-th viewing position signal 12-2 to 12-n and corresponding each of a second to an n-th focal distance signal 13-2 to 13-n supplied from corresponding each of the second to the n-th cameras 10-2 to 10-n, for outputting each of a second to an n-th corresponding small region signal, respectively, first to n-th neighboring small region average calculation means 16-1 to 16-n each for outputting a first to an n-th neighboring small region average signal, respectively, supplied with a small region signal set 4 consisting of the first to the n-th corresponding small region signal and a viewing position signal set 5 consisting of the first to the n viewing position signal 12-1 to 12-n, first to n-th differential calculation means 18-1 to 18-n, each of the first to the n-th differential calculation means 18-1 to 18-n being supplied with corresponding each of the first to the n-th corresponding small region signal and corresponding each of the first to the n-th neighboring small region average signal for outputting each of a first to an n-th differential signal, sum calculation means 60 for outputting a differential sum signal 61 supplied with the first to the n-th differential signal, minimum cost depth selection means 62 for outputting a 3-dimensional signal 63 and a count signal 64, supplied with the differential sum signal 61, the reference pixel position signal 66 and the depth signal 68, reference pixel position counting means 65 for outputting the reference pixel position signal 66 supplied with the count signal 64, and depth counting means 67 for outputting the depth signal 68 supplied with the reference pixel position signal 66.

Now, operation of the first embodiment of FIG. 1 is described.

The reference pixel position counting means 65 output the reference pixel position signal 66 indicating coordinates ($x_k$, $y_k$) of a reference pixel $p_k$ in first image data taken by the first camera 10-1 represented by the first image signal 11-1.

The first small region extraction means 14-1 outputs the corresponding small region signal indicating data of 5×5 pixels around the reference pixel $p_k$ extracted from the first image signal 11-1 taken by the first camera 10-1.

The second small region extraction means 14-2 output the second corresponding small region signal indicating data of 5×5 pixels around a second corresponding pixel position ($x_2$, $y_2$) extracted from the second image signal 11-2 taken by the second camera 10-2, where the second corresponding pixel position ($x_2$, $y_2$) of the second image signal 11-2 is calculated as follows, according to the equations (2) beforehand described, from a baseline $B_{1,2}$ indicated by the second viewing position signal 12-2, a focal distance F indicated by the second focal distance signal 13-2 and a depth z indicated by the depth signal 68:

$x_2 = B_{1,2}F/z + x_k$, $y_2 = y_k$.

In the same way, the i-th (i being each integer from three to n) small region extraction means 14-i outputs the i-th corresponding small region signal indicating data of 5×5 pixels around an i-th corresponding pixel position ($x_i = B_{1,i}F/z + x_k$, $y_k$) extracted from the i-th image signal 11-i talen by the i-th camera 10-i.

All of the first to the n-th corresponding small region signal thus obtained are supplied to every of the first to the n-th neighboring small region average calculation means 16-1 to 16-n as the small region signal set 4, marked with a light hatched allow in FIG. 1, together with the viewing position signal set 5 marked with a deep hatched allow consisting of the first to the n viewing position signal 12-1 to 12-n.

The first neighboring small region average calculation means 16-1 select neighboring cameras 10-j, difference of viewing position $|X_j - X_1|$ to each thereof smaller than a predetermined value C, and output the first neighboring small region average signal according to an average brightness value of pixels included in each of the corresponding small region signals corresponding to the neighboring cameras 10-j, calculated as follows:

$$\text{the average brightness} = \frac{1}{25 N_1} \sum_{j \in \arg_j |X_j - X_1| < C} g_{x,y}^j,$$

where $N_1 = \Sigma_{j \in \arg_j |X_j - X_1| < C} 1$ is a number of the neighboring cameras 10-j concerning the first camera 10-1 and $g_{x,y}^j$ is brightness of a pixel at relative coordinates (x, y) of 5×5 pixel plane of each of the corresponding small region signals.

In the same way, the i-th (i being each integer from two to n) neighboring small region average calculation means 16-i output the i-th neighboring small region average signal by calculating an i-th average brightness as follows:

$$i\text{-}th \text{ average brightness} = \frac{1}{25 N_i} \sum_{j \in \arg_j |X_j - X_i| < C} g_{x,y}^j, \quad (3)$$

where $N_i = \Sigma_{j \in \arg_j |X_j - X_i| < C} 1$ is a number of the neighboring cameras 10-j concerning the i-th camera.

Each of the first to the n-th neighboring small region average signal thus obtained is supplied to corresponding each of the first to the n-th differential calculation means 18-1 to 18-n together with corresponding each of the first to the n-th corresponding small region signal.

Each (i-th, for example, i being each integer from one to n) of the first to the n-th differential calculation means 18-1 to 18-n calculate an i-th square sum of difference of every pixel brightness of the i-th corresponding small region signal to the i-th average brightness indicated by the i-th neighboring small region average signal, as follows, to be output to the sum calculation means 60 as each of the first to the n-th differential signal:

$$i\text{-}th \text{ square sum} = \sum_x \sum_y \left( g_{x,y}^j - \frac{1}{25 N_i} \sum_{j \in \arg_j |X_j - X_i| < C} g_{x,y}^j \right)^2. \quad (4)$$

The sum calculation means 60 calculate a sum of each of the first to the n-th square sum according to the first to the n-th differential signal, which is supplied to the minimum cost depth selection means 62 as the differential sum signal 61.

A sequence of processes above described is performed for each value of the depth z between $z^{min}$ and $z^{max}$ of the depth signal 68 generated by the depth counting means 67.

The minimum cost depth selection means 62 select a depth estimation $z(x_k, y_k)$ giving a minimum value of the differential sum signal 61 among values of the depth z between $z^{min}$ and $z^{max}$, and revise the count signal 64 for shifting the reference pixel $P_k$.

Repeating above procedure by assigning each pixel of the first image data taken by the first camera 10-1 to the reference pixel $P_k$ according to the count signal 64, the 3-dimensional signal 63 is obtained, which represents information z(x, y) of a 3-dimensiona structure of the object indicating the depth estimation at each coordinates (x, y) on a plane of the first image data.

Thus operates the apparatus for 3-dimensional structure estimation according to the first embodiment.

As heretofore described, average brightnesses each defined by the equation (3) of the small regions in the image data taken by neighboring cameras are calculated by the first to the n-th neighboring small region average calculation means 16-1 to 16-n to be considered, in the embodiment.

Figure 5:
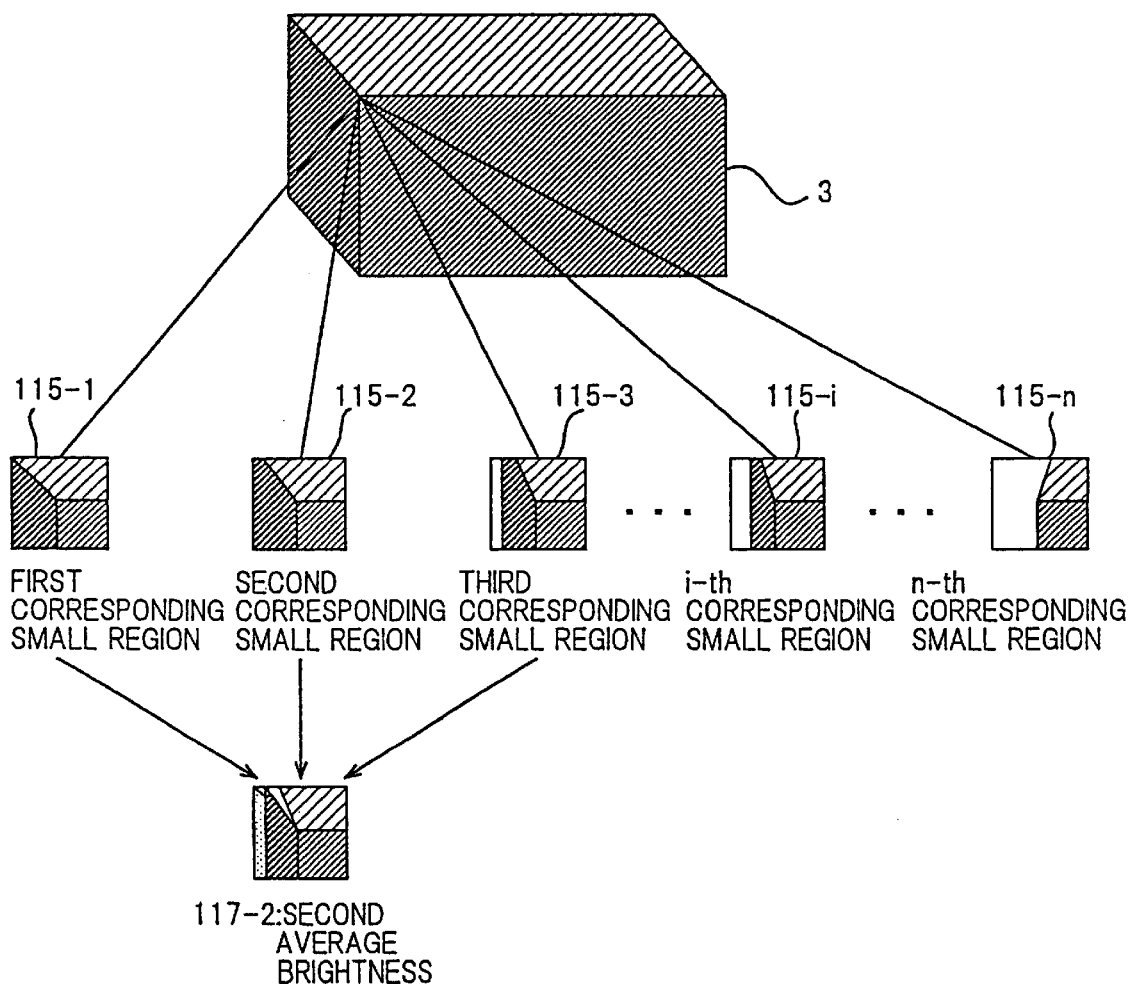
FIG. 5 is a schematic diagram illustrating, by way of example, the second average brightness 117-2 represented by the second small region average signal 17-2 output from the second neighboring small region average calculation means 16-2 of FIG. 1.
Figure 6:
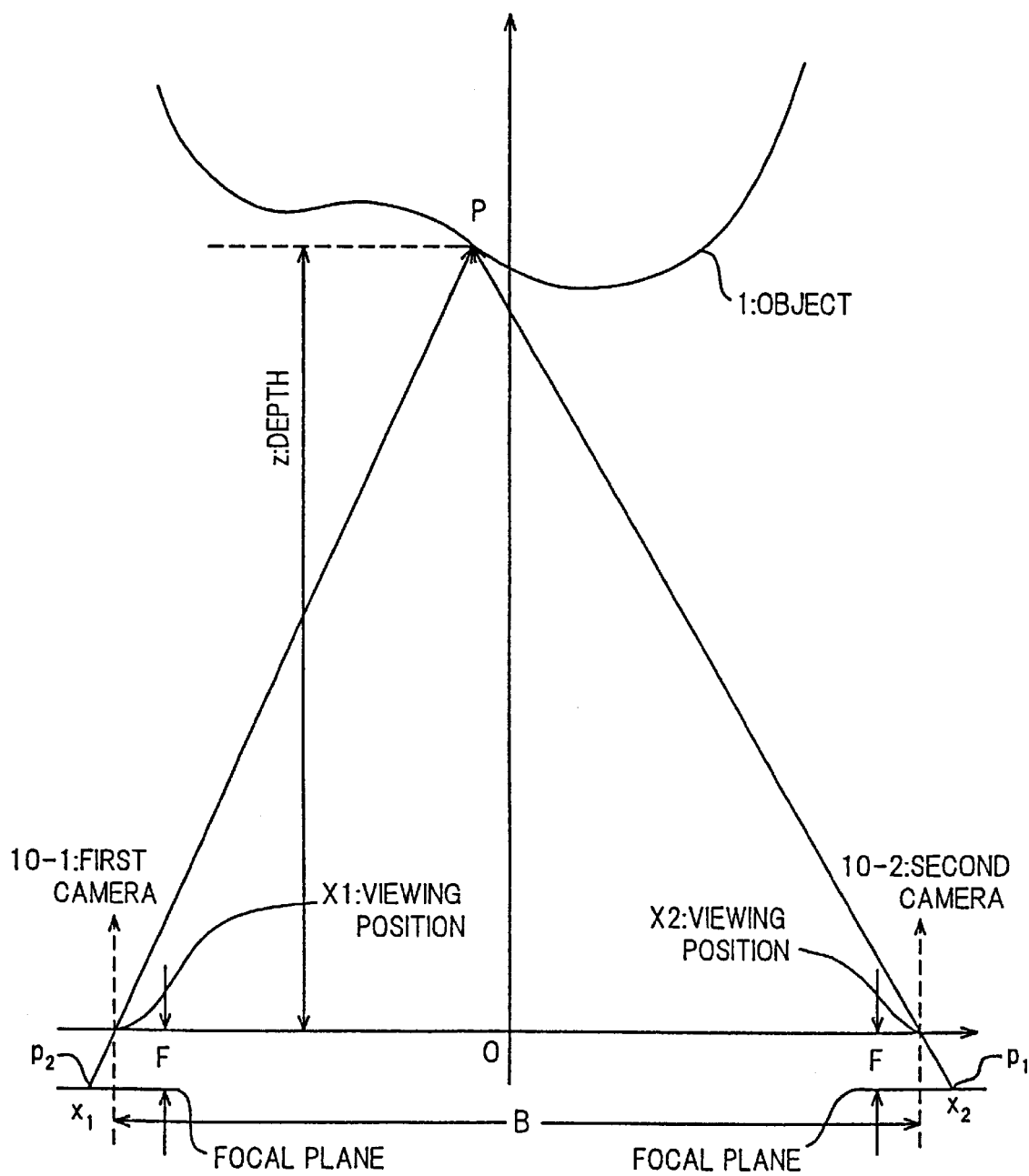
FIG. 6 is a schematic diagram illustrating principle of a stereo-method.
Figure 7:
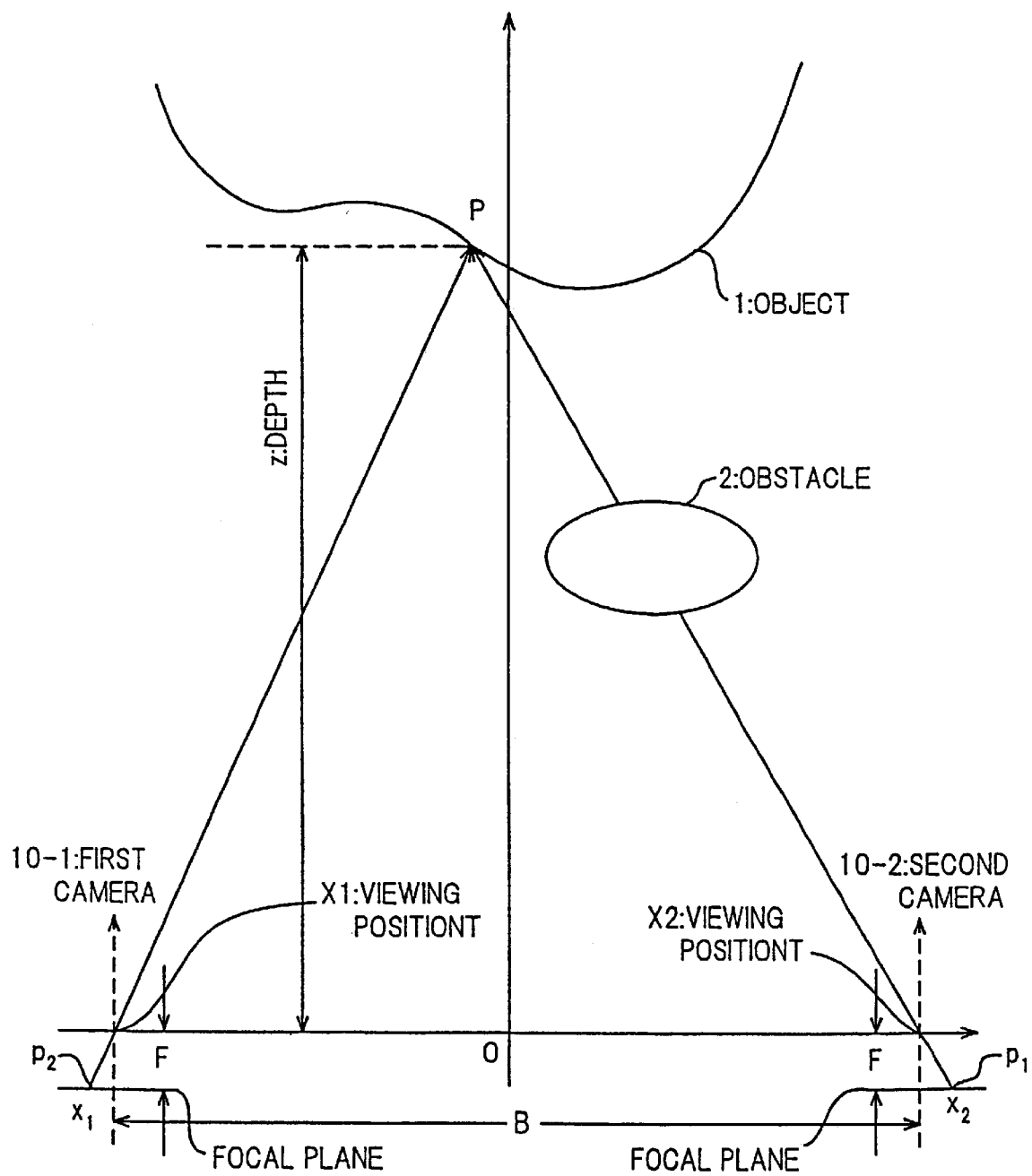
FIG. 7 illustrates an obstacle 2 in front of the object 1.

FIG. 5 is a schematic diagram illustrating, by way of example, the second average brightness 117-2 represented by the second neighboring small region average signal output from the second neighboring small region average calculation means 16-2, which is obtained by averaging a first corresponding small region 115-1 represented by the first corresponding small region signal to a third corresponding small region 115-3 represented by the third corresponding small region signal, for example, wherein is no extreme difference.

Therefore, the first problem of the prior arts beforehand described that the correspondence of the small regions may not be discriminated correctly because of the extreme difference thereof due to large difference of viewing angle can be eliminated in the embodiment, enabling to obtain still higher estimation precision by enlarging the baseline length.

Further, the sum of the square sums each defined by the equation (4) indicating a differential value is calculated by the sum calculation means 60 according to the first to the n-th differential signal to be made use of as the evaluation value, in the embodiment.

Therefore, the second problem of the prior arts that the correspondence estimation is easily affected with the variation of reflectivity owing to difference of viewing angles can be also reduced greatly in the embodiment, resulting in still higher estimation reliability. Heretofore, the present invention is described in connection with the first embodiment of FIG. 1. However, the scope of the invention is not limited in the first embodiment.

For example, in the embodiment of FIG. 1, the size of the corresponding small regions is described to have 5×5 pixels. However it may be any appropriate size.

Figure 8:
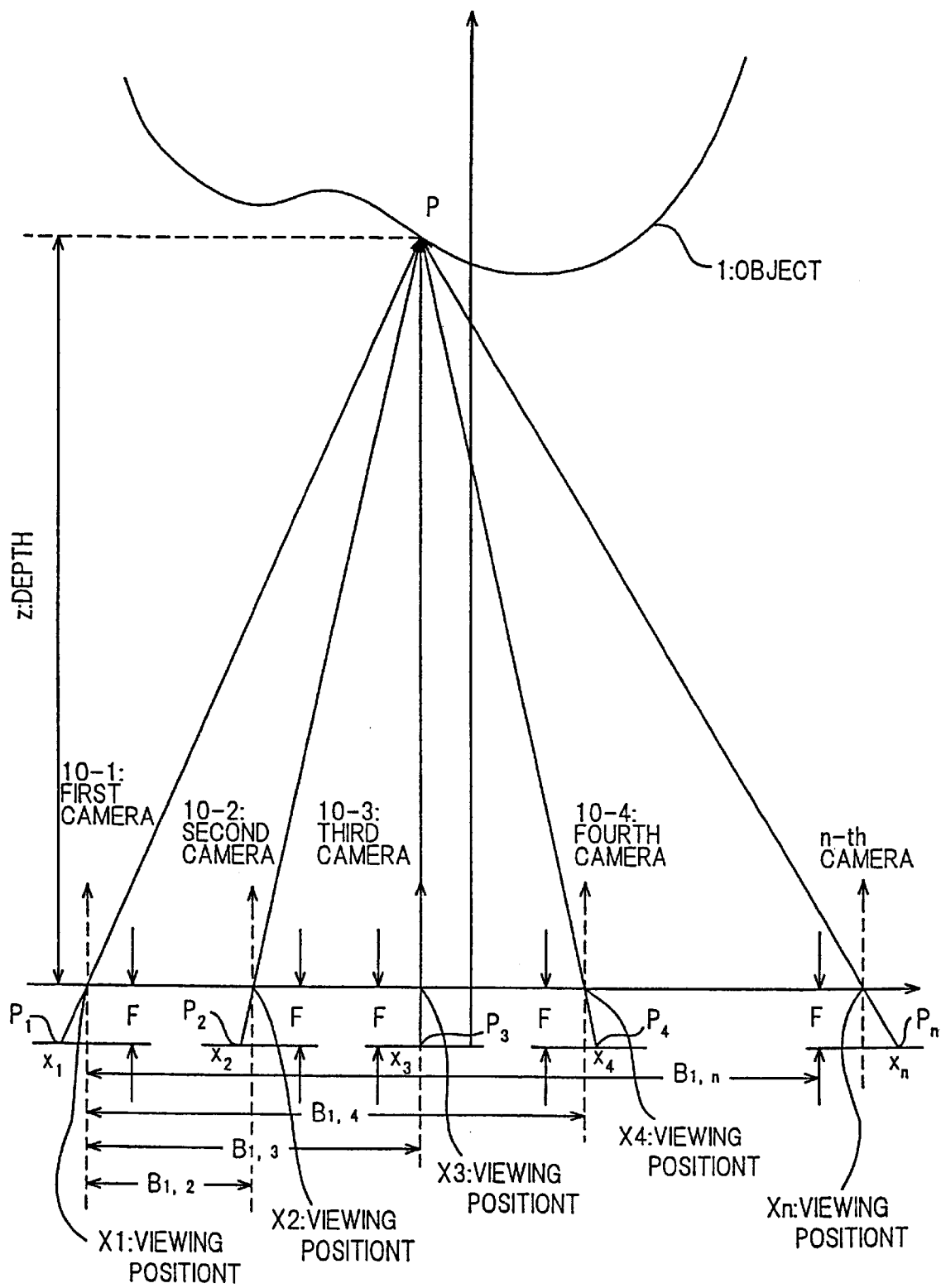
FIG. 8 is a schematic diagram illustrating a multi-baseline stereo-method.
Figure 9:
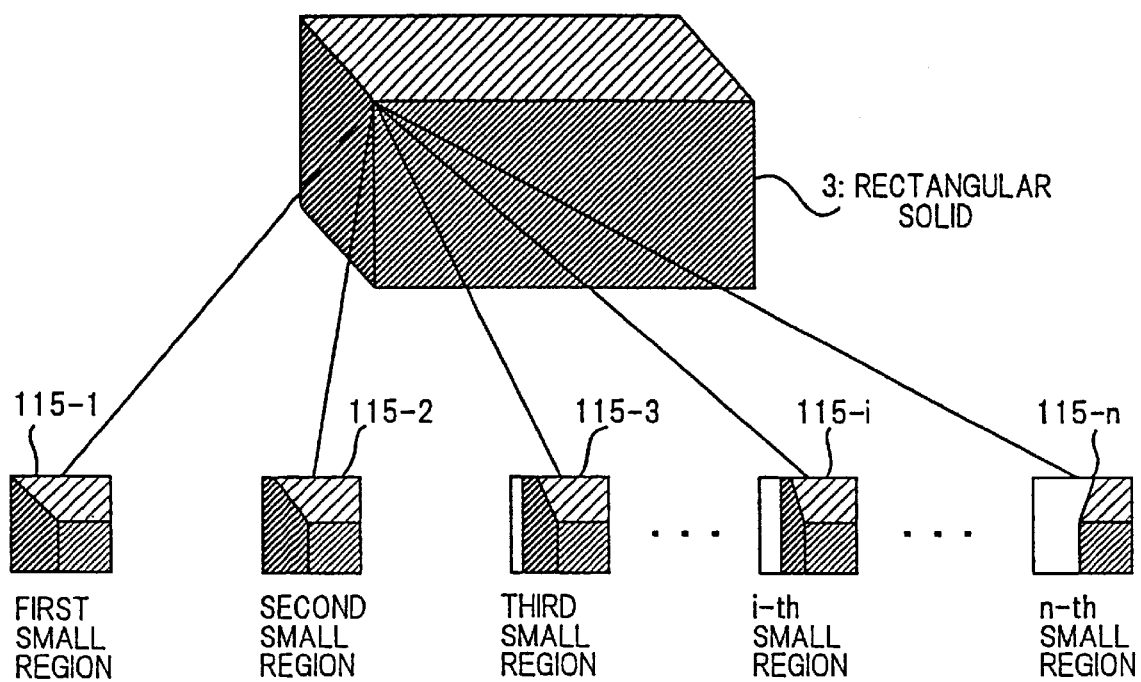
FIG. 9 is a schematic diagram illustrating the small regions 115-1 to 115-n of n pictures of a rectangular solid 3 corresponding to left-upper front corner thereof taken with the first to the n-th cameras 10-1 to 10-n.
Figure 10:
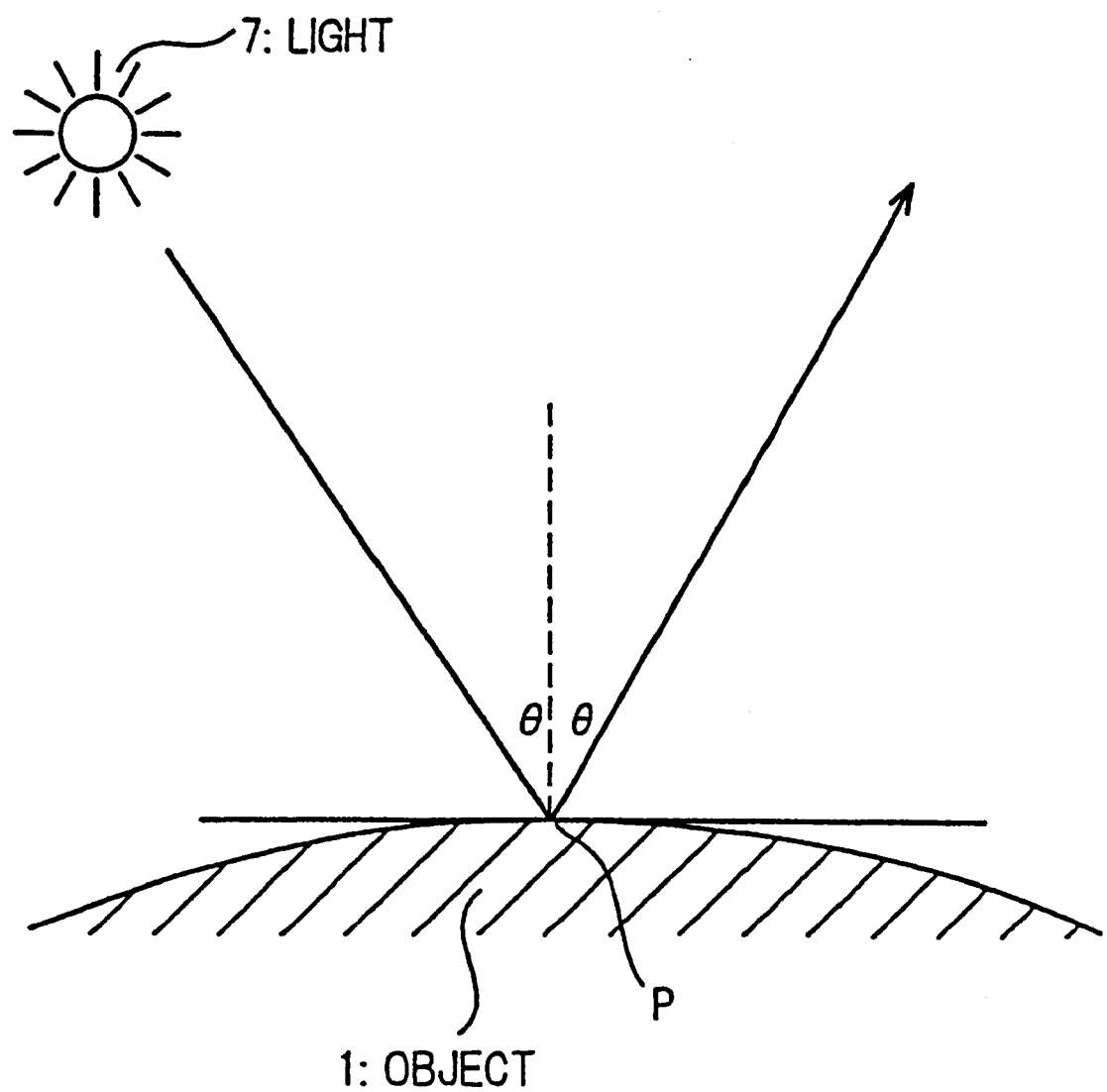
FIG. 10 illustrates variation of brightness of a point P of the object owing to difference of viewing angle.

Further, the first camera 10-1 is illustrated to be positioned most left in FIG. 8. However, any other camera may be assigned to the first camera.

Further, the average brightnesses of corresponding small regions are calculated according to the equation (3), and the square sums of difference of every pixel brightness thereof to the average brightnesses are calculated according to the equation (4), in the embodiment, as values representing correspondence of the corresponding small regions of pictures taken by the neighboring cameras. However, they may be calculated according to any other equations appropriate for representing the correspondence among corresponding small regions corresponding to the neighboring cameras.

Still further, each of the first to the n-th image signal 11-1 to 11-n is described to be supplied from each of the first to the n-th camera. However, each of them may be supplied sequentially from a camera which is shifted to each of the viewing positions sequentially.

Figure 2:
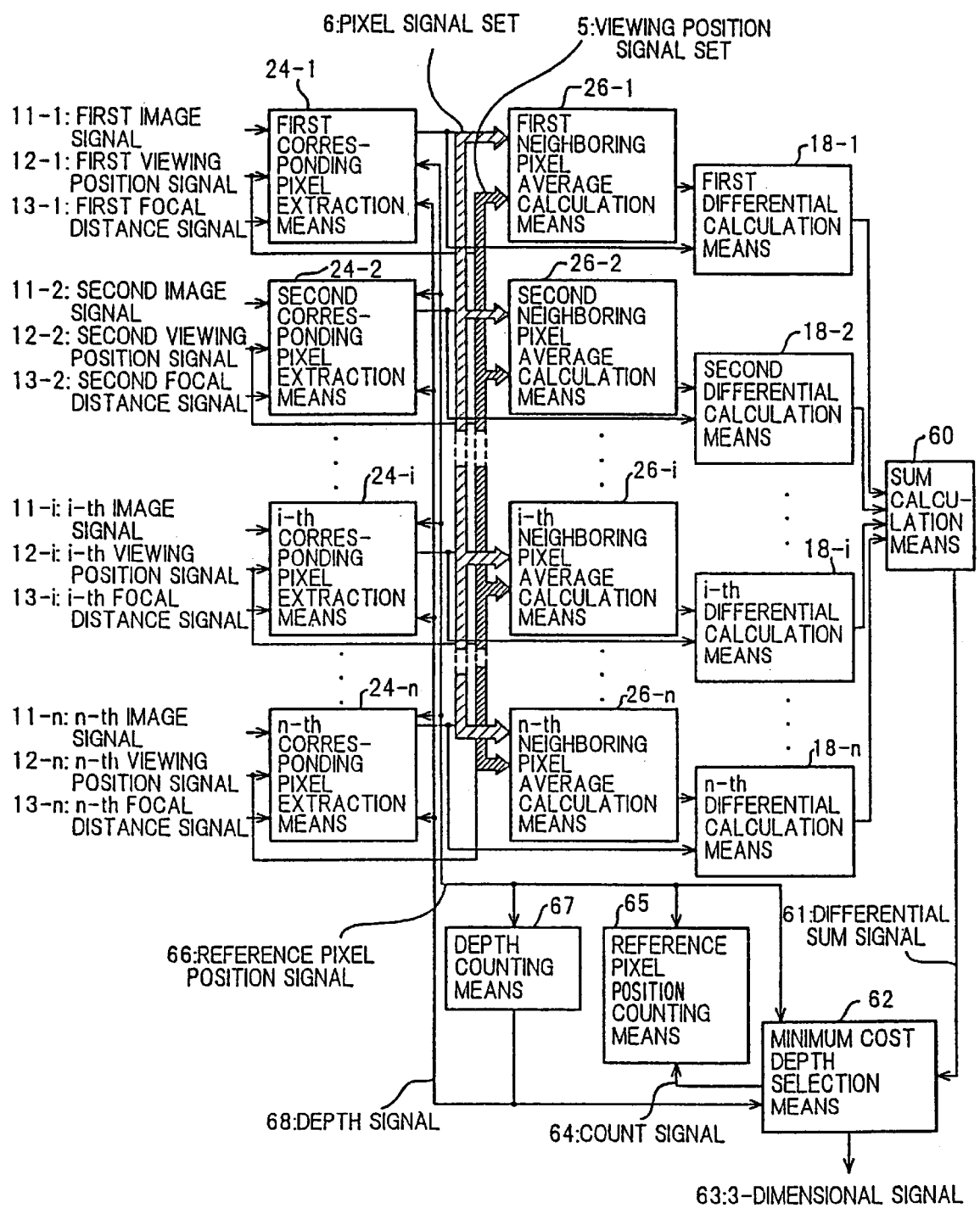
FIG. 2 is a block diagram illustrating an apparatus for 3-dimensional structure estimation according to a second embodiment.

Now, a second embodiment of the invention is described referring to a block diagram of FIG. 2 illustrating an apparatus for 3-dimensional structure estimation according to the second embodiment, wherein a size of 1×1 pixel of the small regions is applied.

In the second embodiment having a similar configuration to the first embodiment of FIG. 1, the first to the n-th small region extraction means 14-1 to 14-n of FIG. 1 are replaced with a first to an n-th corresponding pixel extraction means 24-1 to 24-n each extracting a value of a pixel corresponding to the reference pixel $P_k$ according to the equation (2) from corresponding each of the first to the n-th image signal 11-1 to 11-n for outputting as each of a first to an n-th corresponding pixel signal.

All of the first to the n-th corresponding pixel signal are supplied to every of a first to an n-th neighboring pixel average calculation means 26-1 to 26-n, each replacing each of the first to the n-th neighboring small region average calculation means 16-1 to 16-n of FIG. 1, as a pixel signal set 6 marked with a light hatched allow in FIG. 2, together with the viewing position signal set 5 marked with a deep hatched allow consisting of the first to the n-th viewing position signal 12-1 to 12-n.

Each, i-th for example, of the first to the n-th neighboring pixel average calculation means 26-1 to 26-n output an i-th neighboring pixel average signal having an average of values indicated by the corresponding pixel signals corresponding to neighboring cameras 10-j, by selecting the neighboring cameras 10-j in the same way with the first embodiment of FIG. 1.

Each, i-th for example of the first to the n-th differential calculation means 18-1 to 18-n calculate an i-th square difference of the i-th corresponding pixel signal to the i-th neighboring pixel average signal in a similar way with the first embodiment of FIG. 1, as follows, to be output to the sum calculation means 60 as each of the first to the n-th differential signal:

$$i\text{-}th \text{ square difference} = \left( g^i - \frac{1}{N_i} \sum_{j \in \arg_j |X_j - X_i| < C} g^j \right)^2.$$

where $g^i$ being the pixel value of the i-th corresponding pixel signal.

Following processes are performed in the same way to the first embodiment of FIG. 1.

That is, the sum calculation means 60 calculate a sum of the first to the n-th square difference according to the first to the n-th differential signal, which is supplied to the minimum cost depth selection means 62 as the differential sum signal 61. The sequence of processes above described is performed for each value of the depth z between $z^{min}$ and $z^{max}$ of the depth signal 68 generated by the depth counting means 67. The minimum cost depth selection means 62 select a depth estimation $z(x_k, y_k)$ giving a minimum value of the differential sum signal 61 among values of the depth z between $z^{min}$ and $z^{max}$, and revise the count signal 64 for shifting the reference pixel $p^k$. Repeating above procedure by assigning each pixel of the first image data taken by the first camera 10-1 to the reference pixel $p^k$ according to the count signal 64, the 3-dimensional signal 63 is obtained, which represents information $z(x, y)$ of a 3-dimensiona structure of the object indicating the depth estimation at each coordinates (x, y) on the plane of the first image data.

Thus operates the apparatus for 3-dimensional structure estimation according to the second embodiment.

Figure 3:
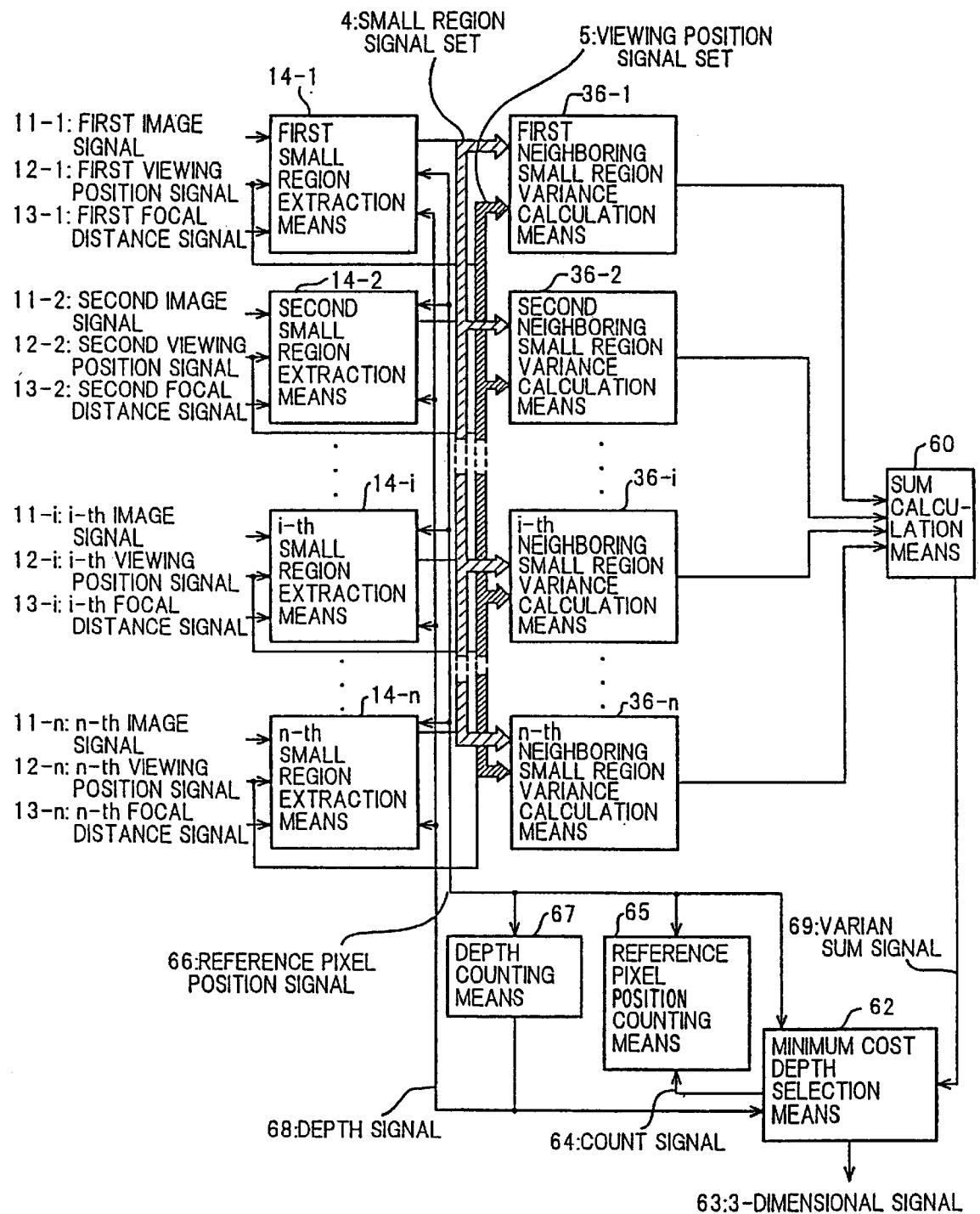
FIG. 3 is a block diagram illustrating an apparatus for 3-dimensional structure estimation according to a third embodiment.

In a third embodiment of the invention illustrated by a block diagram of FIG. 3, variances of the corresponding small regions of the pictures taken by neighboring cameras are calculated for representing the correspondence among them.

In the third embodiment having a similar configuration to the first embodiment of FIG. 1, each pair of the first to the n-th neighboring small region average calculation means 16-1 to 16-n and the first to the n-th differential calculation means 18-1 to 18-n of FIG. 1 is replaced with a first to an n-th neighboring small region variance calculation means 36-1 to 36-n. Other components are the same with the first embodiment of FIG. 1, and so, duplicated description is omitted.

The small region signal set 4 and the viewing position signal set 5 are supplied to all of the first to the n-th neighboring small region variance calculation means 36-1 to 36-n.

Each, i-th for example, of the first to the n-th neighboring small region variance calculation means 36-1 to 36-n output an i-th variance signal defined by following equation (5) indicating a variance of pixel values indicated by the corresponding small region signals corresponding to neighboring cameras 10-j, by selecting the neighboring cameras 10-j in the same way with the first embodiment of FIG. 1.

$$i\text{-}th \text{ variance} = \qquad (5)$$

$$\frac{1}{N_i} \sum_x \sum_y \sum_{l \in \arg_l |X_l - X_i| < C} \left( g^l_{x,y} - \frac{1}{25 N_i} \sum_{j \in \arg_j |X_j - X_i| < C} g^j_{x,y} \right)^2.$$

The sum calculation means 60 calculate a sum of the first to the n-th variance according to the first to the n-th variance signal, which is supplied to the minimum cost depth selection means 62 as a variance sum signal 69, and the minimum cost depth selection means 62 outputs the 3-dimensional signal 63 in the same way with the first or the second embodiment.

Figure 4:
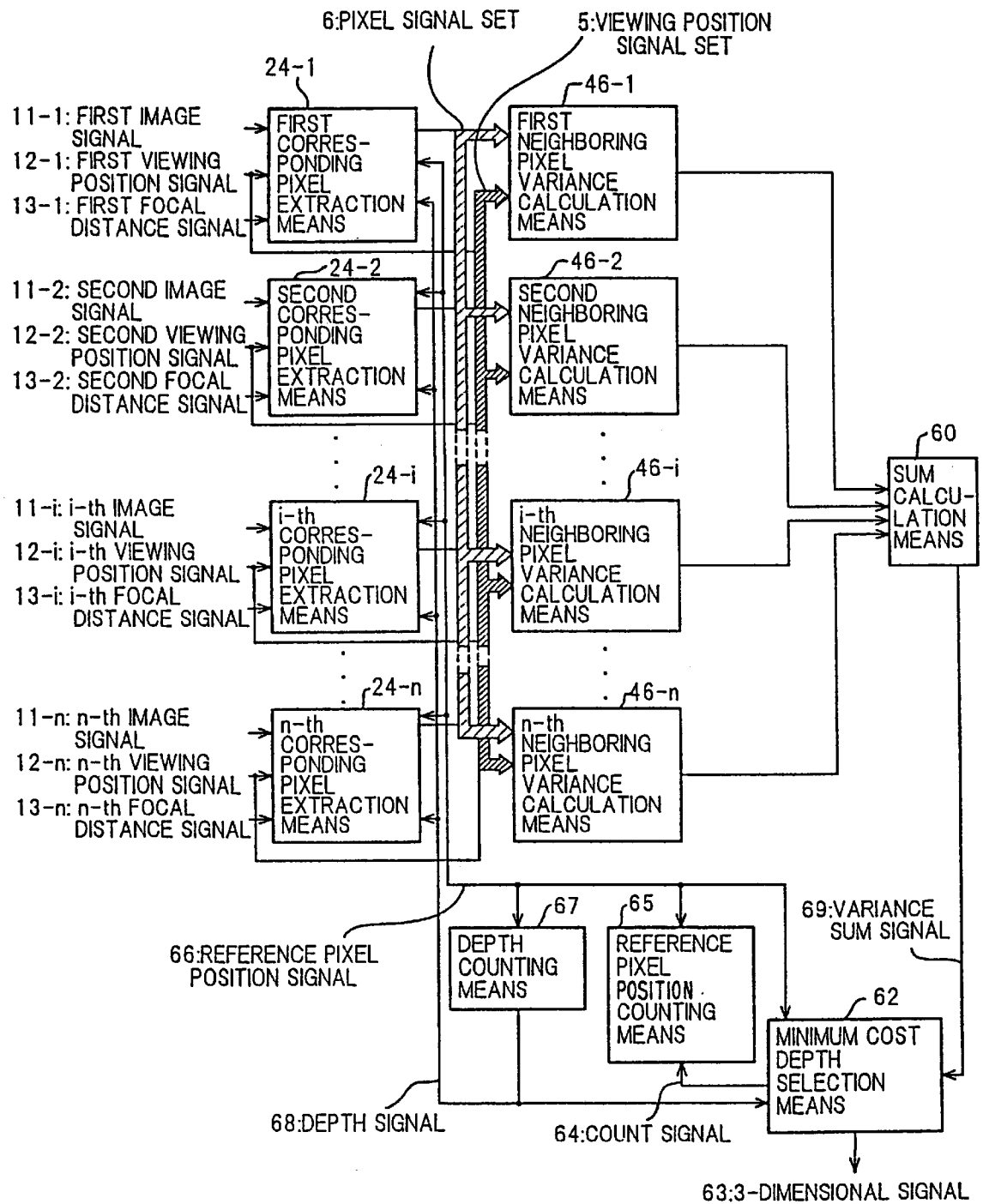
FIG. 4 is a block diagram illustrating an apparatus for 3-dimensional structure estimation according to a fourth embodiment.

In a fourth embodiment illustrated by a block diagram of FIG. 4, the 1×1 size of the corresponding small regions is applied to the third embodiment, in a similar way with the second embodiment of FIG. 2 wherein it is applied to the first embodiment, duplicated description being omitted.

Thus, the apparatus for 3-dimensional estimation according to the invention can realize a high estimation precision together with a high estimation reliability at the same time.

What is claimed is:

1. A method of 3-dimensional structure estimation for estimating a 3-dimensional structure of an object from image data of a plurality of pictures of the object each taken from each viewing position arranged on a straight line by a camera with an optical axis parallel to a direction perpendicular to the straight line; said method having a step of performing, for each pixel of image data of a first of the plurality of pictures, steps of:

extracting corresponding small regions, each having a size of at least one pixel, each from the image data of each of the plurality of pictures, a position of each of said corresponding small regions in corresponding each of the plurality of pictures being defined by a focal distance of the camera, a distance between a viewing position wherefrom said corresponding each of the plurality of pictures is taken and a viewing position wherefrom the first of a plurality of pictures is taken, a position of a concerning pixel of image data of the first of the plurality of pictures, and a variable representing a depth of a point of the object corresponding to said concerning pixel;

calculating a neighboring correspondence value for each of said corresponding small regions, said neighboring correspondence value representing correspondence among said corresponding small regions of neighboring certain of the plurality of pictures;

obtaining a sum of said neighboring correspondence value of all of said corresponding small regions;

selecting an estimation value in a predetermined range of said variable which gives a minimum value of said sum of said neighboring correspondence value for each pixel of image data of the first picture by controlling a depth counting unit and a reference pixel position counting unit; and outputting said estimation value as an estimation of said depth of said point corresponding to said concerning pixel.

2. The method of 3-dimensional structure estimation recited in claim 1, wherein each of the plurality of pictures is taken by a camera positioned at said each viewing position.

3. The method of 3-dimensional structure estimation recited in claim 1, wherein the plurality of pictures are taken by cameras each positioned at said each viewing position.

4. The method of 3-dimensional structure estimation recited in claim 1, wherein said neighboring correspondence value is a square sum of a difference of every pixel value of said each of said corresponding small regions to an average of pixel values of said corresponding small regions of said neighboring certain of the plurality of pictures.

5. The method of 3-dimensional structure estimation recited in claim 1, wherein said neighboring correspondence value is a variance of pixel values in said corresponding small regions of said neighboring certain of the plurality of pictures.

6. A method of 3-dimensional structure estimation recited in claim 1, wherein:

controlling the depth counting unit comprises supplying a reference pixel position signal to the depth counting unit and outputting a depth signal corresponding to the depth of the point corresponding to said concerning pixel; and controlling the reference pixel position counting unit comprises supplying a count signal to the reference pixel position counting unit and outputting a reference pixel position signal.

7. A method of 3-dimensional structure estimation recited in claim 6, wherein:

calculating a neighboring correspondence value comprises calculating an average brightness value of pixels included in each of the corresponding small region signals corresponding to neighboring cameras.

8. A method of 3-dimensional structure estimation recited in claim 7, further comprising selecting an estimation value for each value of the depth signal generated by the depth counting unit.

9. A method of 3-dimensional structure estimation recited in claim 8, further comprising:

assigning each pixel of the first of the plurality of pictures to the concerning pixel;

updating the count signal; and outputting said estimation value as an estimation of said depth of each point on a plane corresponding to each of the concerning pixels to estimate a 3-dimensional structure of the object.

10. A method of estimating a 3-dimensional structure of an object from image data of a plurality of pictures of the object each taken from each viewing position arranged on a straight line by a camera with an optical axis parallel to a direction perpendicular to the straight line; said method comprising:

extracting corresponding small regions each from the image data of each of the plurality of pictures, a position of each of said corresponding small regions in corresponding each of the plurality of pictures being defined by a focal distance of the camera, a distance between a viewing position wherefrom said corresponding each of the plurality of pictures is taken and a viewing position wherefrom a first of the plurality of pictures is taken, a position of a reference pixel of image data of the first of the plurality of pictures, and a variable representing a depth of a point of the object corresponding to said reference pixel;

calculating, for each of the plurality of pictures, an average pixel value of said corresponding small regions of neighboring certain of the plurality of pictures;

calculating a differential of pixel values of each of said corresponding small regions to said average pixel value corresponding to said each of said corresponding small regions;

outputting a sum of said differential of all of said corresponding small regions as a differential sum;

varying a value of said variable in a range;

revising said position of said reference pixel; and obtaining 3-dimensional structure information of the object by finding a value of said variable which makes said differential sum minimum for each pixel of image data of the first picture by controlling a depth counting unit and a reference pixel position counting unit.

11. A method of estimating a 3-dimensional structure of an object from image data of a plurality of pictures of the object each taken from each viewing position arranged on a straight line by a camera with an optical axis parallel to a direction perpendicular to the straight line; said method comprising:

extracting corresponding pixels each from the image data of each of the plurality of pictures, a position of each of said corresponding pixels in corresponding each of the plurality of pictures being defined by a focal distance of the camera, a distance between a viewing position wherefrom said corresponding each of the plurality of pictures is taken and a viewing position wherefrom a first of the plurality of pictures is taken, a position of a reference pixel of image data of the first of the plurality of pictures, and a variable representing a depth of a point of the object corresponding to said reference pixel;

calculating, for each of the plurality of pictures, an average pixel value of said corresponding pixels of neighboring certain of the plurality of pictures;

calculating a differential of a pixel value of each of said corresponding pixels to said average pixel value corresponding to said each of said corresponding pixels;

outputting a sum of said differential of all of said corresponding pixels as a differential sum;

varying a value of said variable in a range;

revising said position of said reference pixel; and obtaining 3-dimensional structure information of the object by finding a value of said variable which makes said differential sum minimum for each pixel of image data of the first picture by controlling a depth counting unit and a reference pixel position counting unit.

12. A method of estimating a 3-dimensional structure of an object from image data of a plurality of pictures of the object each taken from each viewing position arranged on a straight line by a camera with an optical axis parallel to a direction perpendicular to the straight line; said method comprising:

extracting corresponding small regions each from the image data of each of the plurality of pictures, a position of each of said corresponding small regions in corresponding each of the plurality of pictures being defined by a focal distance of the camera, a distance between a viewing position wherefrom said corresponding each of the plurality of pictures is taken and a viewing position wherefrom a first of the plurality of pictures is taken, a position of a reference pixel of image data of the first of the plurality of pictures, and a variable representing a depth of a point of the object corresponding to said reference pixel;

calculating, for each of the plurality of pictures, a variance of pixel values in said corresponding small regions of neighboring certain of the plurality of pictures;

outputting a sum of said variance of all of said corresponding small regions as a variance sum;

varying a value of said variable in a range;

revising said position of said reference pixel; and obtaining 3-dimensional structure information of the object by finding a value of said variable which makes said variance sum minimum for each pixel of image data of the first picture by controlling a depth counting unit and a reference pixel position counting unit.

13. A method of estimating a 3-dimensional structure of an object from image data of a plurality of pictures of the object each taken from each viewing position arranged on a straight line by a camera with an optical axis parallel to a direction perpendicular to the straight line; said method comprising:

extracting corresponding pixels each from the image data of each of the plurality of pictures, a position of each of said corresponding pixels in corresponding each of the plurality of pictures being defined by a focal distance of the camera, a distance between a viewing position wherefrom said corresponding each of the plurality of pictures is taken and a viewing position wherefrom a first of the plurality of pictures is taken, a position of a reference pixel of image data of the first of the plurality of pictures, and a variable representing a depth of a point of the object corresponding to said reference pixel;

calculating, for each of the plurality of pictures, a variance of values of said corresponding pixels of neighboring certain of the plurality of pictures;

outputting a sum of said variance of all of said corresponding pixels as a variance sum;

varying a value of said variable in a range;

revising said position of said reference pixel; and obtaining 3-dimensional structure information of the object by finding a value of said variable which makes said variance sum minimum for each pixel of image data of the first picture by controlling a depth counting unit and a reference pixel position counting unit.

* * * * *